United States Patent [19]

Cornic et al.

[11] Patent Number: 5,598,163
[45] Date of Patent: Jan. 28, 1997

[54] METHOD AND SYSTEM FOR OBJECT DETECTION WITHIN AN ANGULAR ZONE, AND ITS APPLICATIONS

[75] Inventors: Pascal Cornic, St Renan; Patrice Crenn, Plougonvelin, both of France

[73] Assignee: Thomson-CSF, Puteaux, France

[21] Appl. No.: 53,157

[22] Filed: Apr. 23, 1993

[30] Foreign Application Priority Data

Apr. 30, 1992 [FR] France .................................. 92 05373

[51] Int. Cl.⁶ .............................. G01S 7/28; G01S 13/06; G01S 13/60
[52] U.S. Cl. ........................... 342/70; 342/157; 342/107; 342/113; 342/146
[58] Field of Search ................................. 342/70, 71, 72, 342/157, 158, 114, 146, 107, 113

[56] References Cited

U.S. PATENT DOCUMENTS

| 4,638,321 | 1/1987 | Drogin | 342/444 |
| 5,008,678 | 4/1991 | Herman | 342/158 |
| 5,396,256 | 3/1995 | Chiba et al. | 342/372 |
| 5,448,244 | 9/1995 | Komatsu et al. | 342/155 |

FOREIGN PATENT DOCUMENTS

| 7305070 | 9/1973 | France . |
| 7232249 | 4/1974 | France . |
| 2642144 | 3/1978 | Germany . |

OTHER PUBLICATIONS

M. I. Skolnik, "Introduction to Radar Systems", 2d ed, McGraw–Hill, USA, 1981 pp. 279–282.
R. G. Wiley, "Electronic Intelligence: . . . Radar Signals", 1985 ARTECH House, U.S–, pp. 87–101.

Primary Examiner—John B. Sotomayor
Attorney, Agent, or Firm—Oblon, Spivak, McClelland, Maier & Neustadt, P.C.

[57] ABSTRACT

A method for detecting fixed or moving objects within an angular zone, as may be used in vehicle anti-collision systems, employs separate and distinct transmission and reception patterns. The transmission pattern successively illuminates consecutive segments of the angular zone. The reception pattern receives echo signals in parallel from illuminated objects in each zone segment. The echo signals are then digitally beam formed into a total field signal. The angular positions of the detected objects are then derived from the total field signal.

18 Claims, 7 Drawing Sheets

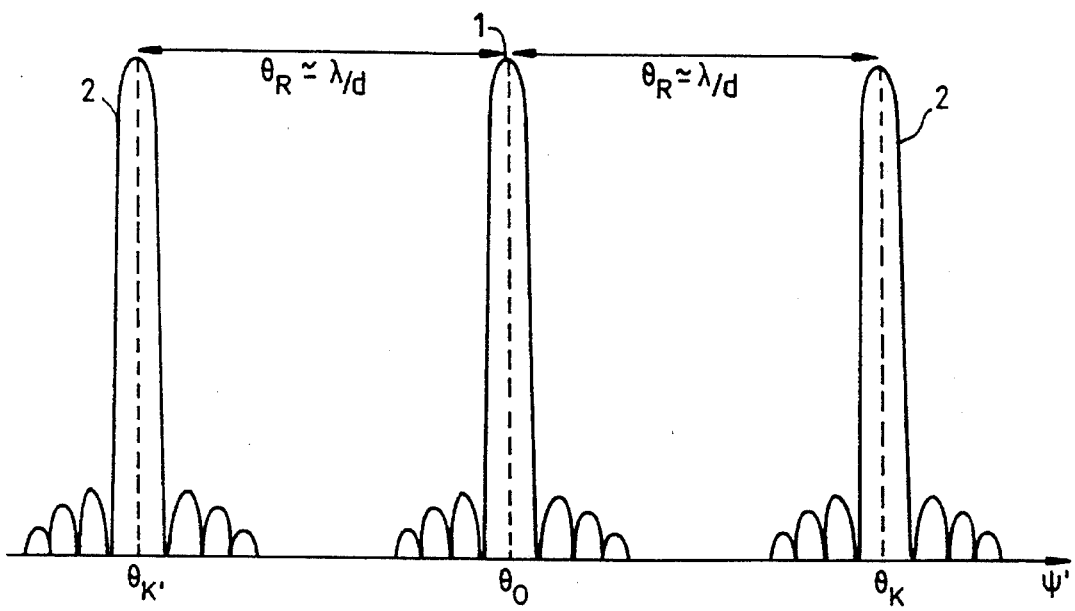
FIG. 1
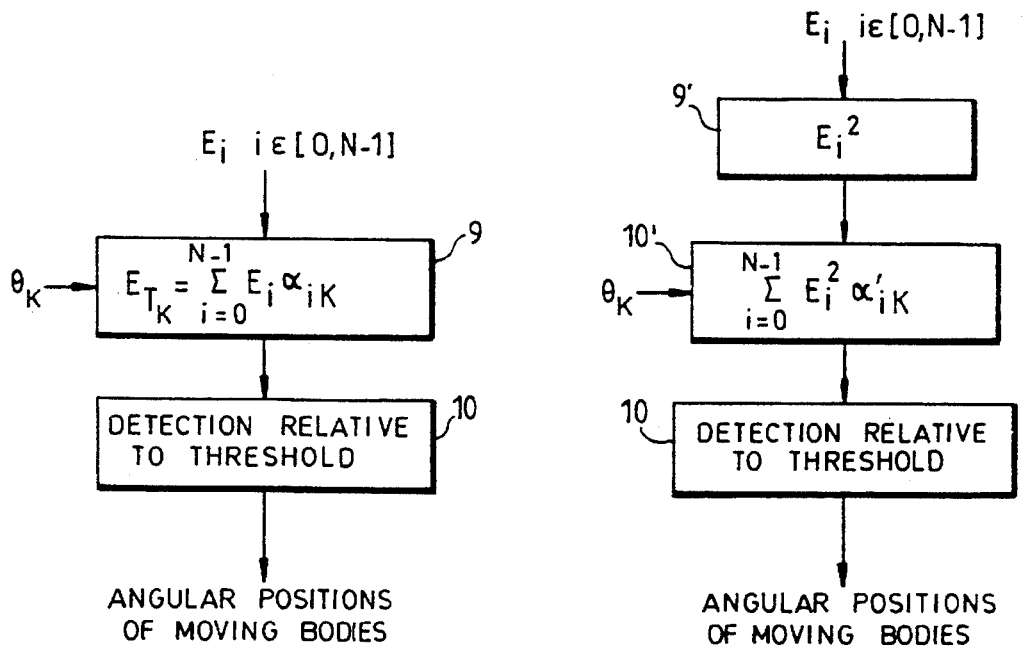
FIG. 3a
FIG. 3b

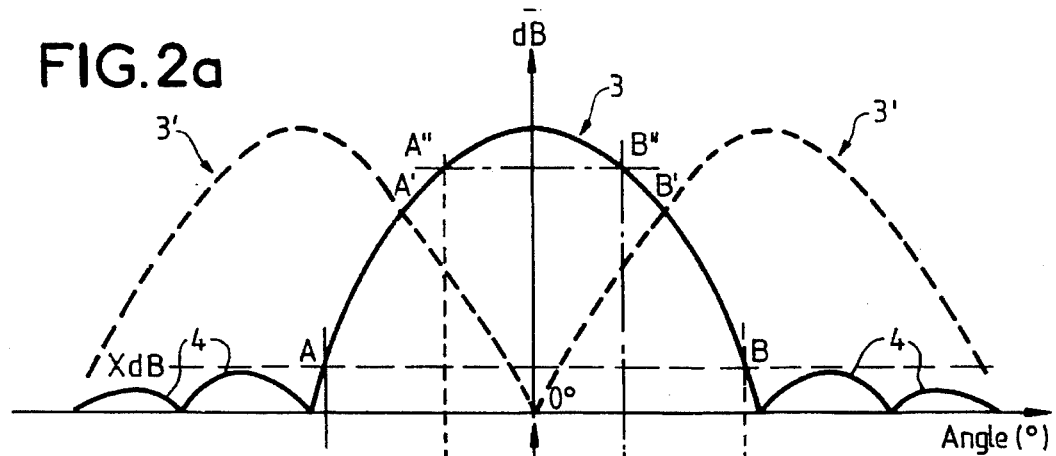
FIG.2a
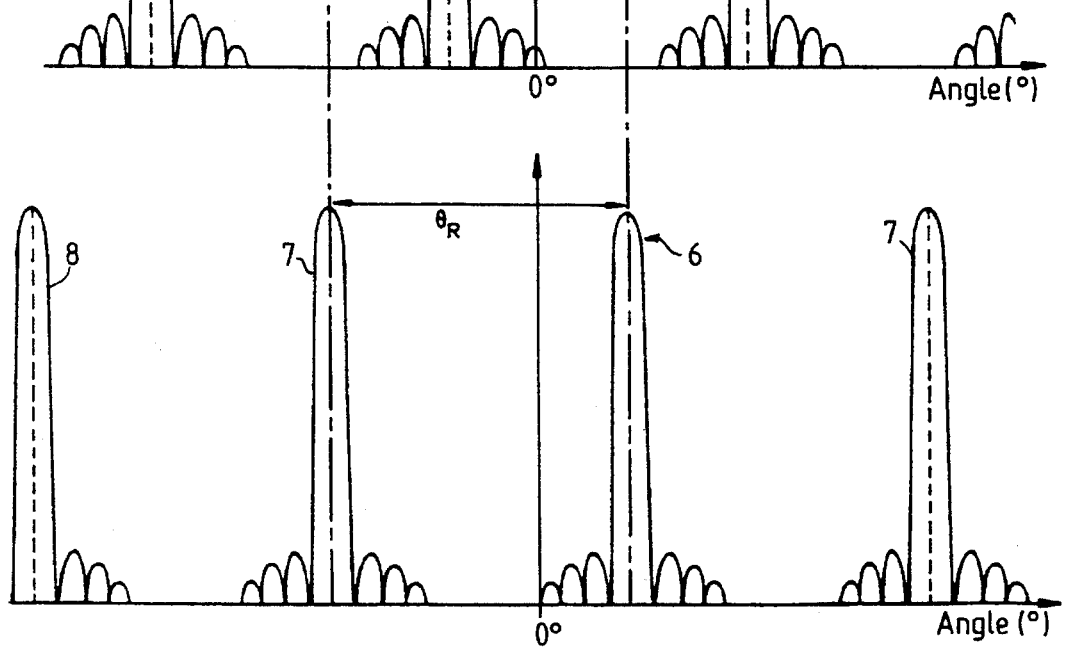
FIG.2b
FIG.2c

METHOD AND SYSTEM FOR OBJECT DETECTION WITHIN AN ANGULAR ZONE, AND ITS APPLICATIONS

BACKGROUND OF THE INVENTION

The present invention relates to a method and a system for detecting one or several objects in an angular zone, and its various applications.

One particular field of application of the invention relates to anti-collision devices, notably for automobiles. In this field, it is required to carry out detailed analysis of a zone situated in front of a vehicle. The purpose of such analysis is to immediately warn the driver of the vehicle when there is a danger of collision. Decisions to issue an alert by anti-collision devices are a function of various criteria which themselves depend on the position and relative speed of the other vehicles presenting the risk, of the radar signature, etc.

The aim of the present invention is to refine the spatial analysis of the zone situated ahead of a vehicle so as to be able, firstly, to situate detected vehicles with respect to the road they are travelling on and, secondly, to distinguish two vehicles that are close to each other.

In order to achieve this, the analysing radar needs to have extremely stringent characteristics as regards its resolving power and angular accuracy.

The solutions that are usually proposed consist in using narrow-beam radar and sweeping the zone to be analysed. Such sweeping, or scanning, is generally mechanical which has the disadvantage of being difficult to install on production-line vehicles, and above all of being insufficiently reliable as regards safety requirements.

Moreover, electronic scanning cannot be adapted to this type of radar, as it is not currently known how to provide technologically an electronic scanning antenna operating with millimetric waves. The cost of producing it would moreover be prohibitive in view of the market being aimed at.

SUMMARY OF THE INVENTION

The present invention provides a method that is intermediate between mechanical scanning and electronic scanning, which consists in adapting the principle of DBF (digital beam forming) to the relevant problem.

More precisely, the invention provides a method using electromagnetic waves to detect one or more objects located in a given angular zone comprising the steps of:

successively illuminating, during transmission, a plurality of elementary zones that divide up said angular zone using at least one radiation pattern having a main lobe, said main lobe being defined as the region of said radiation pattern above a fixed threshold which is higher than or equal to the level of the side lobes of said pattern, said main lobe completely including a useful portion corresponding to a region free of overlap by main transmission lobes for the consecutive elementary zones;

receiving echo signals on a thinned array comprising several receiving elements and having an array function such that, for each illuminated elementary zone, a first lobe of said array function is comprised within said useful portion, and the two lobes immediately preceding and succeeding said first lobe are outside said main lobe, reception employing digital beam forming in a plurality of angular directions $\theta_{78}$ belonging to said elementary zone;

detecting, by comparison with a given threshold, the presence of echoes received in the various angular directions $\theta_{78}$;

and deducing therefrom the angular position of objects detected.

The invention also relates to a detection system using electromagnetic waves for carrying out the said method, comprising:

a plurality of transmitting antennae, transmission from which is controlled by command means enabling said antennae to successively illuminate elementary zones;

a receiving device comprising a thinned receiving array comprising several receiving elements, and a receiver linked to the receiving elements of said array, said receiver having means for digital beam forming and means for detecting echoes received in the various angular directions $\theta_{78}$.

The invention finally relates to the various applications of the above system to collision prevention and vehicle traffic monitoring.

The invention as well as its advantages will be better understood from the description which follows with reference to the attached drawings.

BRIEF DESCRIPTION OF THE DRAWINGS

FIG. 1 shows the general shape of a linear array function of N equidistant detection elements, exhibiting ambiguity lobes.

FIG. 2a is an example of a transmission radiation pattern according to the invention.

FIGS. 2b and 2c show the general shape of the array function at reception, in accordance with the invention, in a particular example where the beam is deflected.

FIG. 3a illustrates the digital beam forming method carried out according to the invention.

FIG. 3b shows a possible improvement to the method in FIG. 3a.

DETAILED DESCRIPTION OF PREFERRED EMBODIMENTS

Figure 4:
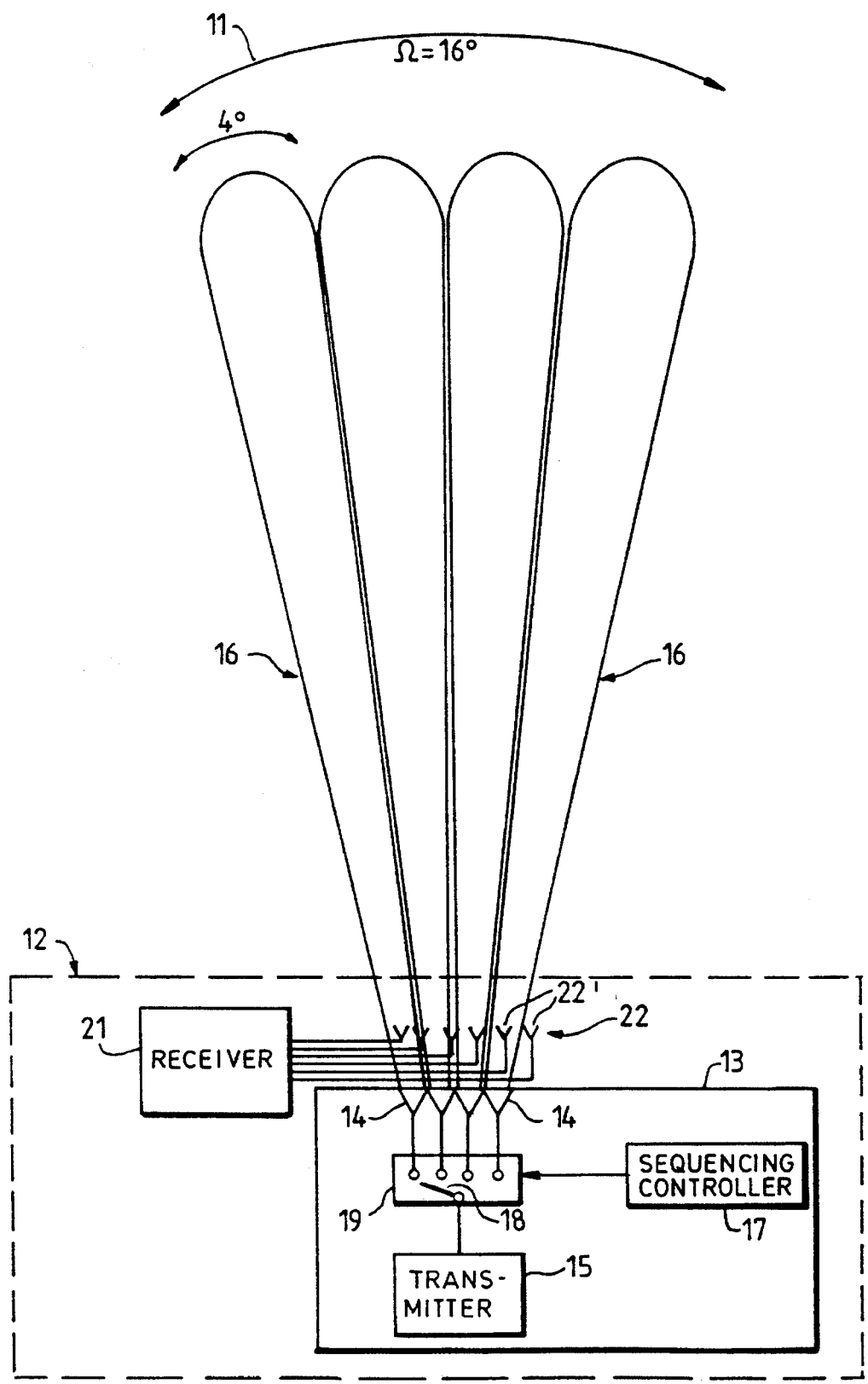
FIG. 4 is an example of a possible embodiment of a detection system for implementing the method.

The method and system according to the invention will be described below in relation with a particular application, provided by way of example, which concerns anti-collision devices for automobiles. Thus, numerical values are only given with a view to providing concrete illustration and do not constitute in any way a limitation of the invention.

Adapting the digital beam forming principle, which we shall refer to below by the symbol DBF, to our particular application needed to satisfy a fair number of requirements:

The first important requirement is that any anti-collision device for automobiles must operate using millimetric waves in order not to have prohibitive antenna dimensions for transmission and reception. However, through being tied to an array of receiving elements for reception, the applicant was confronted with a further problem regarding the dimensioning of this array. Effectively, a tradeoff needs to be made between, on the one hand, the need to increase the distance between individual receiving elements to ensure feasability of the device in the millimetric wave range and, on the other hand, the size of the array and the number of individual receiving elements employed which should not be too high for reasons of bulk and cost. The so called thinned array is an array which, by virtue of its structure, corresponds well to the desired tradeoff. However, it suffers from the major disadvantage of introducing angular periodic array lobes for each of which there is a corresponding angular ambiguity. FIG. 1 shows an example of a function of a linear array made up by N elements arranged equidistantly at a distance d referred to as the array pitch, each element having a given radiation characteristic function. It may be recalled that for such an array, the array function or factor, also called the alignment characteristic function is given by the relation:

$$f(\psi) = \frac{\sin\left(N \cdot \frac{\psi'}{2}\right)}{\sin\left(\frac{\psi'}{2}\right)} \text{ with } \psi' = 2\pi d \frac{\sin\theta}{\lambda} + \phi$$

in which

θ is the angular direction of the received signal

λ is the working wavelength d is the array pitch

φ is the constant phase shift between each element of the array and the next one The principal maximum for this function, which is identified by 1 in FIG. 1 is obtained for an angle $\theta_0$ such that $$2\pi d \frac{\sin\theta_o}{\lambda} + \phi = 0$$

The maxima corresponding to the ambiguity lobes, identified by 2 in FIG. 1 are obtained for all angles $\theta_{78}$ such that $$2\pi \frac{d}{\lambda} [\sin\theta_k - \sin\theta_o] = 2k\pi$$

The interval between two successive lobes of the array, in other words the array's periodicity is thus:

$$\theta_R = \text{Arcsin} \frac{\lambda}{d} \cong \frac{\lambda}{d}$$

In FIG. 1, only three lobes are shown. More of them obviously exist. The consequence of the existence of these ambiguity lobes is that, if the transmitting antenna which is required to monitor a given angular zone Ω illuminates a zone that includes more than one lobe of the receiving array, it will be impossible to discriminate the echoes received.

A first solution consists in eliminating these lobes from the array as much as possible, in other words reducing the array pitch. This solution is however ruled out as it automatically leads to a high number of array elements and moreover comes into conflict with the point where an array using millimetric waves become unfeasible.

The method according to the invention provides for inhibition of the effect of the ambiguity lobes by dividing up the monitored angular zone Ω into a plurality of elementary zones which are illuminated successively in such a way that, when one elementary zone is being illuminated by a given main lobe of the transmission radiation pattern, there is a reception array lobe preferentially comprised within a 3 dB width of this main lobe, the two other immediately preceding and succeeding array lobes being only very slightly, if at all, illuminated by the said main lobe.

FIGS. 2a to 2c illustrate the principle of this method:

In FIG. 2a, the shape of a possible transmission radiation pattern for illuminating a given elementary zone of the total angular zone to be observed is shown. This transmission pattern has a main lobe 3 defined as being the region of the transmission pattern above a fixed X dB threshold and preferably totally covering the elementary zone. It also has side lobes 4 the level which is below this same given X dB threshold, for example −23 dB. The points of intersection between main lobe 3 and the X dB threshold will be called A and B. The shape of the main lobes 3' illuminating elementary zones on each side of the elementary zone we are dealing with has also been shown in dashed lines. It should be borne in mind that, according to the invention, the illuminations do not occur simultaneously but rather successively. The main lobes 3 and 3' intersect at two points A' and B' which can be preferably selected to be the same as the two points A'', B'' which correspond to the 3-dB width of main lobe 3.

We shall call the segment of the curve comprised between points A' and B' the useful portion. The useful portion is hence fully included by the main lobe 3, and corresponds to the region that is free of overlap by the main transmission lobes 3' for the adjoining elementary zones.

FIGS. 2b and 2c illustrate the constraints that were set for the reception array function: the array function needed to be such that, for the elementary zone illuminated in accordance with the transmission pattern of FIG. 2a, there exists a first array lobe 6 belonging to the useful portion of the transmission pattern. Preferably, this first array lobe 6 is comprised within the 3-dB width of the transmission pattern, and in FIGS. 2b and 2c, the limiting positions for this first array lobe 6 in the preferred case have been shown. A second essential condition in accordance with the invention, concerning the array function, is that the other array lobes 7 and 8 do not belong to the main lobe 3, as defined previously, of the transmission pattern, so that they are only slightly, or not at all, illuminated. It can be seen on FIG. 2b (respectively on FIG. 2c) that this necessitates a minimum periodicity $\theta_R$ of the array function, in other words one for which the array lobe 7 that immediately succeeds (or, respectively precedes) the first array lobe 6 must, as a minimum requirement, be located at the point of intersection B (or, respectively, A) of the main transmission lobe 3 of FIG. 2a with the X dB threshold.

We shall describe further on, in a precise application, how all the constraints set for the array function make it possible to completely define the thinned reception array.

FIG. 3a illustrates digital beam forming carried out at reception according to the invention.

It should be recalled that the beamforming technique consists in carrying out linear filtering of the signals received by the array receiving elements for bringing signals originating from certain directions $\theta_{78}$ back into phase. Now, the phase shift between the electrical field $E_i$ received by a receiving element i and the field $E_O$ from a receiving element O adopted as a reference is given by $$i\psi = i\, 2\pi d \frac{\sin\theta_k}{\lambda}$$

In order to compensate this phase shift in a fixed direction $\theta_{78}$, it is necessary to multiply the electrical field $E_i$ by a coefficient $\alpha_{ik}$ such that $$\alpha_{ik} = \exp\left[-j2\pi i d \frac{\sin\theta_k}{\lambda}\right]$$

so as to obtain fields $E'_i = E_i \cdot \alpha_{ik}$ that are in phase when pointing in the direction $\theta_{78}$. The total field received, $E_{T_K}$ in the direction $\theta_{78}$ is then given by the relation $$E_{T_K} = \sum_{i=0}^{N-1} E_i \alpha_{ik}$$

In FIG. 3a, the step identified by 9 represents this digital beam forming which is carried out successively or in parallel on a plurality of angular directions $\theta_{78}$ belonging to the angular zone $\Omega$, and notably to the elementary zone illuminated.

The next step, 10, consists in detecting, using comparison with a given threshold, the signals $E_{T_K}$ received in the various angular directions $\theta_{78}$. This detection makes it possible to deduce the angular position of the various moving bodies detected. In an application to automobile collision prevention, a knowledge of angular positions makes it possible to establish danger evaluation criteria.

One possible improvement of the previously described method makes it possible to provide even greater refinement of angular location as follows:

If we now consider the electric field $E_i$ received from a direction $\theta$ by any receiving element i, this field $E_i$ is expressed simply as a function of the field $E_O$ from a receiving element O adopted as a reference, by the formula:

$$E_i = E_o \exp\left[j2\pi i d \frac{\sin\theta}{\lambda}\right] \quad (1)$$

By employing the sum of the terms of a geometric series, this tonal field $E_T$ received from the direction $\theta$ can be expressed by the relation:

$$E_T = \sum_{i=1}^{n} E_i = E_o f(\psi) \quad (2)$$

with $\psi = 2\pi d \frac{\sin\theta}{\lambda}$ and $f(\psi)$, being the array function or factor.

If, moreover, we obtain the sum of the squares of the electrical fields $E_i$, we obtain $$\sum_{i=1}^{n} E_i^2 = E_o^2 f(\psi') \quad (3)$$

with $\psi' = 2\pi \cdot (2d) \frac{\sin\theta}{\lambda}$

If relations (2) and (3) are compared, it will be noticed that the result of squaring is to fictitiously multiply the array pitch by two, and, in consequence, the array's dimension D as well. Now, detection resolution (or angular accuracy) is given by the distance between the 3-dB points of the main lobe of the array function, which is inversely proportional to the dimension D of the array. The effect of squaring is hence a twofold improvement in angular resolution.

FIG. 3b illustrates the method according to the invention with this improvement being taken into account: the first step 9' consists of squaring the electrical field $E_i$ for all the individual receiving elements i of the array, in other words for i comprised in the range $[0, N-1]$. The steps that follow are identical to those in FIG. 3a, with the exception that step 10' in the beam forming provides the sum of the squares $E^2_i$ weighted by a coefficient $\alpha'_{ik}$ such that $$\alpha'_{ik} = \exp\left[-j2\pi i(2d)\frac{\sin\theta_k}{\lambda}\right]$$

In practice, it is however preferable to implement the improvement by squaring after conventional detection of an object. It is thus possible to do a first rough detection with a fairly large angular pitch and then to provide refinement only in those elementary zones for which one or several objects were detected.

The angular refinement step can be carried out by other methods:

One can, for example, employ a technique of the monopulse type, carrying out comparison of the energy received on two adjacent beams. It is also possible to provide angular oversampling followed either by a calculation of true center or by a search for the maximum of the signals received in the various angular directions. It is finally possible to adjust the coefficients $\alpha_{ik}$ of the digital beam forming in an adaptive manner.

FIG. 4 is a practical example of a detection system for carrying out the method according to the invention, applied to the specific problem of automobile collision prevention.

In this precise application, it will be considered that the angular zone to be observed by any moving entity has an angle $\Omega$ of about 16° as shown by the arc identified by reference 11. This numerical value originates from the constraint adopted at the outset which determined that analysis should be over a zone located ahead of the vehicle over a length comprised between about 35 meters (typically beyond the blind zone of radar) and 200 meters (some 115 to 650 feet), with a width equivalent to three highway lanes, in other words approximately 10 meters (about 33 feet).

According to the invention, detection system 12 comprises a transmitting device 13 made up by several transmitting antennae 14, being four in number in the example chosen, fed by a millimetric wave transmitter 15. The transmitting antennae 14 have a radiation pattern which may or may not be identical, with only the width 16 of the 3 dB points of the main lobe being shown. In conformity with the method of the invention, the various distances between the 3-dB points of the main lobes cover elementary zones, for example of 4°, dividing up the angular zone $\Omega$.

Figure 5:
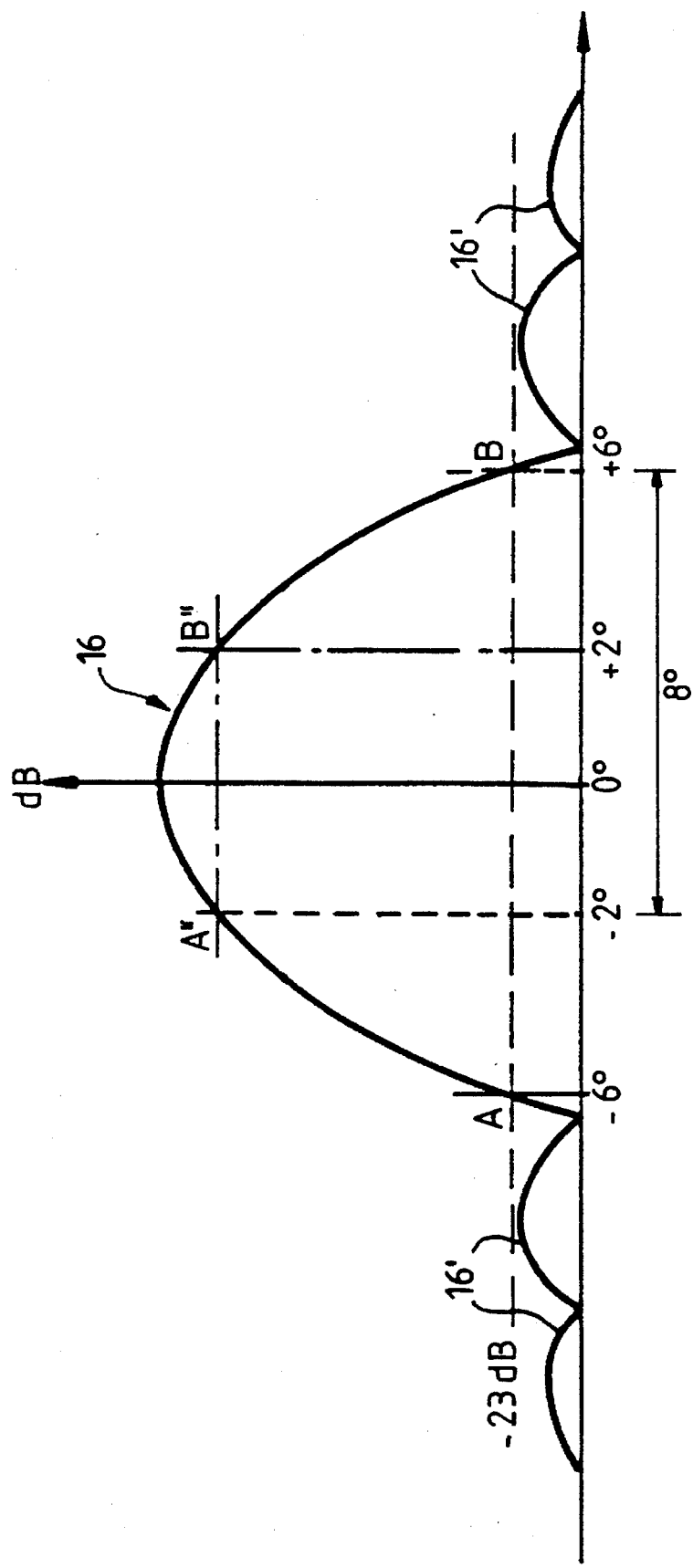
FIG. 5 shows the general shape of a transmission radiation pattern for the system in FIG. 4.

An example of the transmission radiation pattern is given in FIG. 5. Here, the width 16 between the 3 dB points of the main lobe covering a sector of $[-2°, +2°]$ can be seen. The side lobes 16' are below a threshold, for example a $-23$ dB threshold. On FIG. 5, the main lobe is comprised in the range $[-6°, +6°]$, and the useful portion in the range $[-2°, +2°]$.

In order to be able to provide illumination successively in the various elementary zones, the antennae 14 of FIG. 4 have their transmission controlled by command means, for example a sequencing controller 17 which controls closing of a multi-way switch 18 of a microwave frequency switch 19.

The detection system 12 furthermore comprises a receiving device consisting of a receiver 21 linked to a thinned receiving array 22. In the example of FIG. 4, the receiving array 22 is dimensioned so as to be able to obtain overall angular resolution $\alpha$ higher than 2°, with a transmission radiation pattern that conforms to that shown in FIG. 5. The length D of the array is given by the approximate formula $$\frac{70\lambda}{D} = \alpha$$

which can only be employed in the non-limiting assumption that a cosine amplitude weighting is applied to the array, this weighting making it possible to lower the level of the side lobes.

Furthermore, in accordance with FIG. 5, the periodicity $\theta_R$ of the array should be equal to about 8° which enables the pitch d of the array to be obtained by the formula:

$$\theta_R = \text{Arcsin}\frac{\lambda}{d}$$

giving $d \cong 7.18\lambda$

The number N of receiving elements 22' of the array is then given by the relation:

$$D=d(N-1)$$

giving N=6 in our example.

Thus, the constraints employed according to the invention have enabled the thinned reception array 22 to be fully determined.

Figure 6:
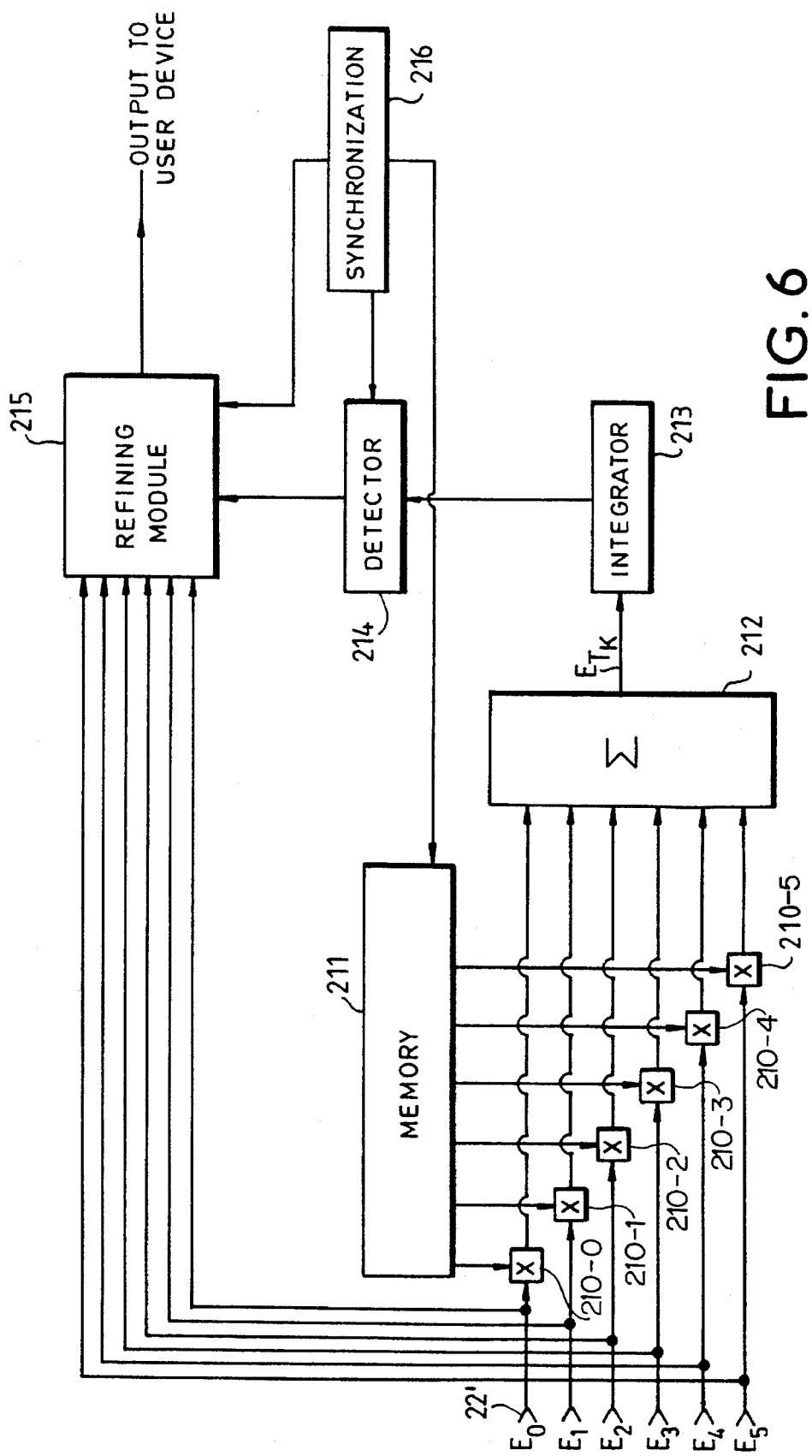
FIG. 6 gives details of an example of a possible embodiment of the receiver in FIG. 4.

FIG. 6 gives details of one possible and practical example of the receiver 21 in FIG. 4. This receiver 21 comprises, as will be indicated in detail below, means 210-0 through 210-5, 211 and 212 for digital beam forming, and means 214 for detecting echoes received in the various directions $\theta_{78}$.

The six signals $E_0$ to $E_5$ received by the six receiving elements 22' of the thinned array are multiplied, by means of multiplication modules 210, by coefficients $\alpha_{ik}$ such as defined previously, which for example originate from a memory 211. The outputs from the six multiplication modules 210 are then added in a summing module 212 which thus calculates the total field $E_{TK}$ received in a direction $\theta_{78}$. The result of summing can be advantageously integrated in an integrator 213 in order to improve the signal-to-noise ratio. After integration, a detector 214 carries out linear or quadratic detection followed by comparison with a predetermined threshold making it possible to deduce the presence of objects in one or several elementary zones. If detection has occurred, detector 214 is able to transmit a refining instruction to a refining module 215 along with data (angles and distances) concerning the regions to be explored more particularly. This enables only rough beam formation and detection to be carried out ahead of detector 214, resulting in a saving in computing time. The refining module 215 then implements an algorithm that improves angular locating, such as squaring, monopulse variance analysis, angular oversampling or adaptive beam forming, on the basis of the signals $E_0$ to $E_5$ received. Memory 211, detector 214 and refining module 215 are synchronised by means of a synchronising unit 216. At the output from module 215, the angular and distance positions of objects that have been detected are known with a high degree of accuracy. They can be made use of for deciding to warn, by any appropriate means, the driver of a possible risk of collision in accordance with predetermined danger criteria.

Figure 7:
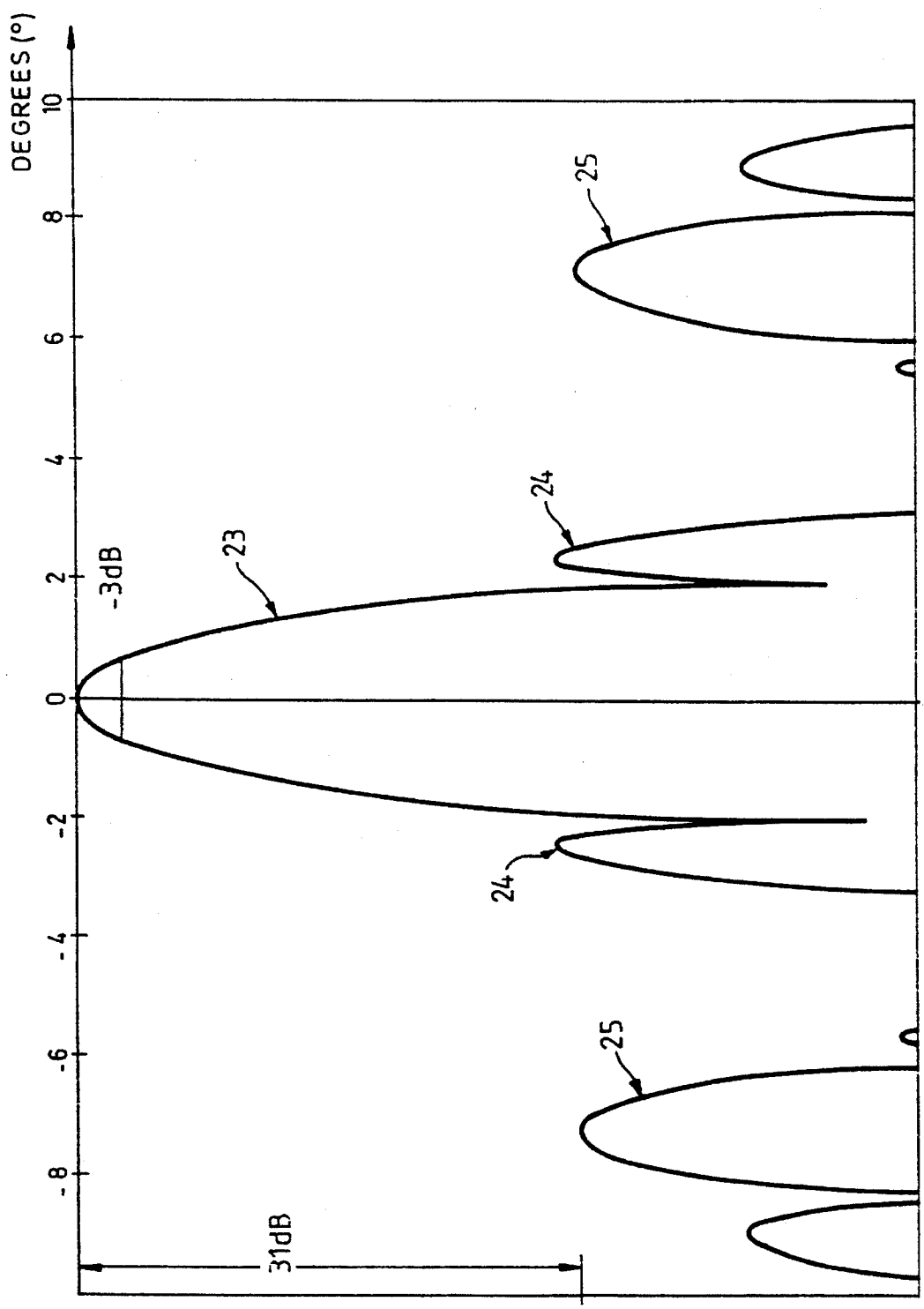
FIGS. 7 and 8 show results obtained by simulation of the system in FIG. 4, respectively with and without beam deflection.
Figure 8:
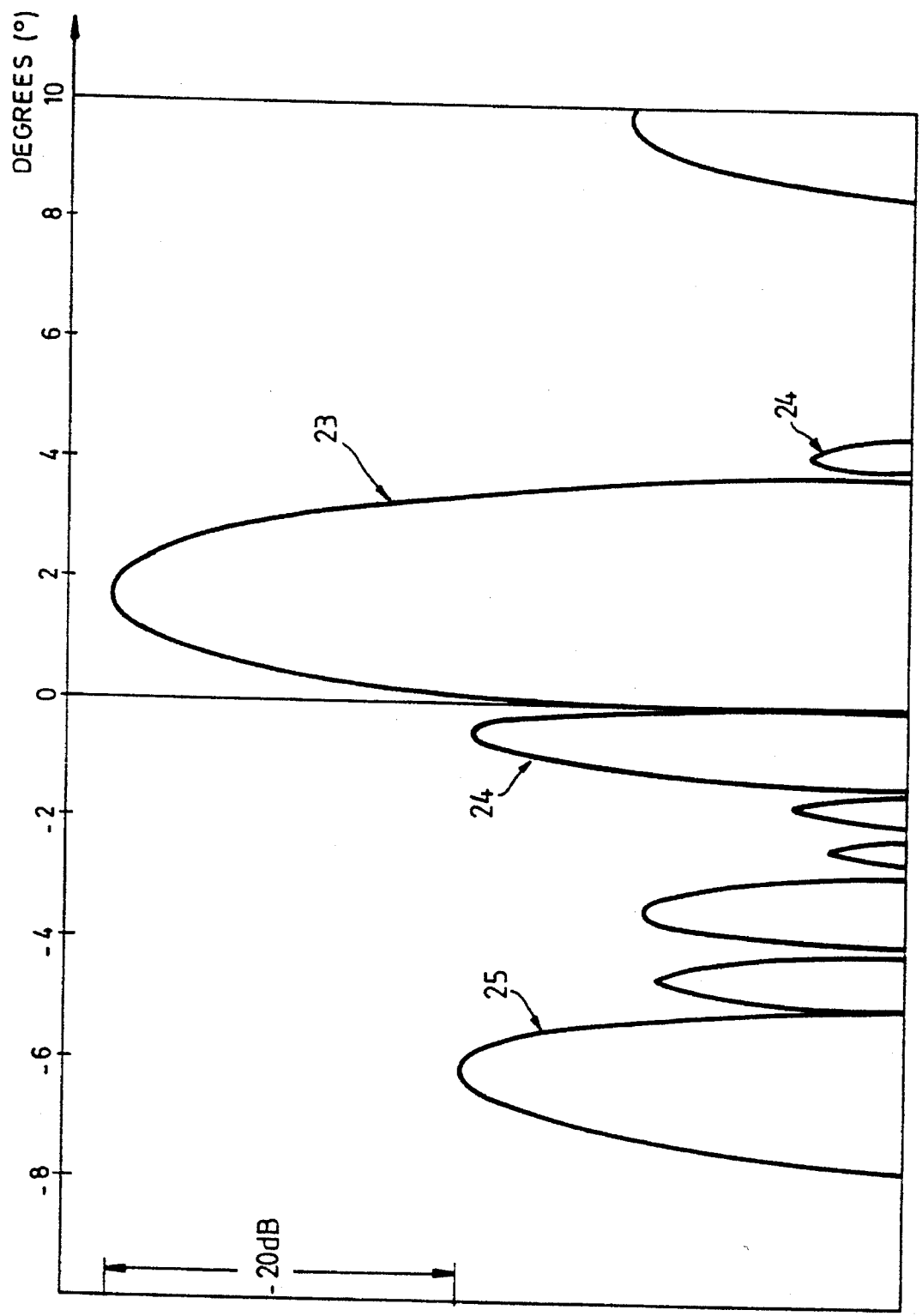

FIGS. 7 and 8 show the results obtained by simulating the product of the transmission function and the overall reception function of the system described in FIG. 4, respectively with the system's line of view along the longitudinal axis of the moving body carrying it, and with the beam deflected through +2° with respect to this axis when the transmitting antenna illuminates over the range −2° to +2°. These simulations enable it to be verified that the dimensioning of the transmission antennae and of the receiving array do in fact lead to the desired performance, this being:

a width of the main lobe 23 of less than 2°;

a very low sidelobe level 24 (less than −20 dB);

array lobes 25 that are at least −20 dB lower when compared to main lobe 23.

The results can obviously be transposed to each one of the pointing directions specific to transmitting antennae.

Better results can be obtained by optimising the transmission radiation pattern in order to obtain a maximum range in the vehicle's axis, the lateral range being limited to what is strictly necessary: one simple way consists in improving the distribution of transmitted power by using transmitting antenna which are not identical as was the case in FIG. 4, but rather two central antennae having a shorter distance between the 3-dB points than that of the two outer antennae.

One can for example chose to use central antennae with a 3° opening and outer antennae with a 5° opening in order to cover the whole 16° angular zone with a substantially constant power.

The system implementing the method according to the invention has been described within the highly special framework of automobile collision prevention systems.

Obviously, the invention can be readily adapted to various fields notably concerning:

obstacle avoidance for helicopters;

aircraft landing aids;

road, air or rail traffic monitoring.

In this latter application, a radar system mounted, for example on a pylon at the edge of the road, would then be fitted with a detection system according to the invention for the purposes of measuring road traffic density, or detecting possible accidents.

The system according to the invention, which is of particular interest for millimetric waves for the reasons that have been seen above is more generally of interest each time that it enables the overall cost of radar to be reduced through minimisation of the number of receivers.

What is claimed is:

1. A method using electromagnetic waves to detect one or more objects located in a given angular zone comprising the steps of:

successively illluminating, during transmission, a plurality of consecutive elementary zones that divide up said angular zone using at least one radiation pattern having a main lobe, said main lobe being defined as the region of said radiation pattern above a fixed threshold which is higher than or equal to the level of the side lobes of said pattern, said main lobe completely including a useful portion corresponding to a region free of overlap by main transmission lobes for said consecutive elementary zones, receiving echo signals in parallel on a thinned array comprising a plurality of receiving elements i, and having an array function such that, for each of said illuminated elementary zones, a first lobe of said array function is comprised within said useful portion, and the two lobes immediately preceding and succeeding said first lobe are outside said main lobe, reception employing digital beam forming in a plurality of angular directions $\theta_{78}$, each said $\theta_\kappa$ corresponding to one of said elementary zones, detecting, by comparison with a given threshold, the presence of echoes received in said various angular directions $\theta_\kappa$, and deducing therefrom an angular position of said objects detected.

2. The detection method of claim 1 further comprising an angular refining step wherein at least one said object has been detected in at least one said angular direction $\theta_{78}$.

3. The detection method of claim 2 wherein said angular refining step comprises the steps of:

squaring an electrical field $E_i$ received by each said receiving element i of said array in said direction $\theta_{78}$, summing said squares of all said electrical fields $E_i$, weighted by a coefficient $\alpha_{ik}$, such that:

$$\alpha_{ik} = \exp[-j2\pi i(2d)\sin\theta_{78}/\lambda]$$

in which $\lambda$ is the transmission wavelength and d is the distance between centers of said receiving elements i, and detecting, by comparison with a given threshold, the presence of echoes received in said direction $\theta_{78}$.

4. The detection method of claim 2 wherein said angular refining step comprises carrying out digital beam forming in an adaptive manner.

5. The detection method of claim 2 wherein said angular refining step comprises seeking maxima for the echoes received and detected in said various angular directions $\theta_\kappa$.

6. The detection method of claim 2 wherein said angular refining step comprises using a monopulse technique, which compares respective signal energy received on two adjacent beams.

7. A detection system using electromagnetic waves for detecting one or more objects located in a given angular zone comprising:

a plurality of transmitting antennae, transmission from which is controlled by a command means which enables said antennae to successively illuminate a plurality of consecutive elementary zones which divide up said angular zone, said transmission using at least one radiation pattern having a main lobe, said main lobe being defined as the region of said radiation pattern above a fixed threshold which is higher than or equal to the level of the side lobes of said pattern, said main lobe completely including a useful portion corresponding to a region free of overlap by main transmission lobes for said consecutive elementary zones, a receiving device comprising a thinned receiving array having a plurality of receiving elements for receiving echo signals in parallel from said objects in said elementary zones, and having an array function such that, for each of said illuminated elementary zones, a first lobe of said array function is comprised within said useful portion, and the two lobes immediately preceding and succeeding said first lobe are outside said main lobe, and having a receiver linked to said receiving elements of said array, said receiver having means for digital beam forming and detecting said echo signals received in various angular directions $\theta_\kappa$.

8. The detection system of claim 7 wherein said command means comprises a sequentially controlled multi-way switching unit.

9. The detection system of claim 7 wherein said means for digital beam forming in one said direction $\theta_\kappa$ comprises:

a memory supplying coefficients $\alpha_{ik}$ such that:

$$\alpha_{ik} = \exp[-j2\pi i(2d)\sin\theta_\kappa/\lambda]$$

in which $\lambda$ is the transmission wavelength, d is the distance between centers of said receiving elements, and $\theta_\kappa$ is the angular direction corresponding to $\alpha_{ik}$, a plurality of multiplication modules equal in number to said plurality of receiving elements in said array, each said multiplication module performing multiplication of each of said echo signals by its corresponding coefficient $\alpha_{ik}$, a summing module for adding the outputs of said multiplication modules to form a total field in said angular direction $\theta_\kappa$.

10. The detection system of claim 7 further comprising a detector for performing detection above a given threshold of said total field output from said beam forming means.

11. The detection system of claim 10 wherein said detector is a linear detector.

12. The detection system of claim 10 wherein said detector is a quadratic detector.

13. The detection system of claim 10 further comprising a synchronizer for synchronizing said memory and said detector.

14. The detection system of claim 13 further comprising a refining module for receiving selected data from said detector when said detection above a given threshold has occurred.

15. The detection system of claim 7 wherein said detection system operates in a millimeter frequency band, for use in a vehicle collision prevention system to analyze a zone located ahead of said vehicle.

16. The detection system of claim 15 wherein said zone to be analyzed corresponds to an angular zone of approximately 16°, wherein said detection system comprises four transmitting antennae and six receiving elements.

17. The detection system of claim 16 wherein said four transmission antennae comprise two central antennae and two lateral antennae, the distance between the 3-db points of said two central antennae being less than the distance between the 3-db points of said two lateral antennae.

18. The detection system of claim 7 wherein said detection system is integrated into a roadside radar system for measuring road traffic density and for detecting possible accidents.

* * * * *